US010171878B2

(12) United States Patent
Carney et al.

(10) Patent No.: US 10,171,878 B2
(45) Date of Patent: Jan. 1, 2019

(54) VALIDATING DATA OF AN INTERACTIVE CONTENT APPLICATION

(71) Applicant: Comcast Cable Communications Management, LLC, Philadelphia, PA (US)

(72) Inventors: John Carney, Corte Madera, CA (US); David DeAndrade, San Anselmo, CA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

(21) Appl. No.: 14/039,734

(22) Filed: Sep. 27, 2013

(65) Prior Publication Data
US 2014/0026165 A1 Jan. 23, 2014
US 2016/0088354 A9 Mar. 24, 2016

Related U.S. Application Data

(60) Division of application No. 10/672,983, filed on Sep. 25, 2003, now Pat. No. 8,578,411, which is a
(Continued)

(51) Int. Cl.
*H04N 21/47* (2011.01)
*H04N 21/8545* (2011.01)
(Continued)

(52) U.S. Cl.
CPC ............. *H04N 21/47* (2013.01); *G06Q 30/02* (2013.01); *H04N 21/241* (2013.01);
(Continued)

(58) Field of Classification Search
CPC ................. H04N 21/47; H04N 21/241; H04N 21/25808; H04N 21/26291;
(Continued)

(56) References Cited

U.S. PATENT DOCUMENTS 5,287,489 A 2/1994 Nimmo et al.
5,321,750 A 6/1994 Nadan
(Continued)

FOREIGN PATENT DOCUMENTS

EP 0624039 A2 4/1994
EP 0624039 A3 11/1994
(Continued)

OTHER PUBLICATIONS

Andreas Kraft and Klaus Hofrichter, "An Approach for Script-Based Broadcast Application Production", Springer-Verlag Brling Heidelberg, pp. 74-82, 1999.
(Continued)

*Primary Examiner* — Pinkal R Chokshi
(74) *Attorney, Agent, or Firm* — Banner & Witcoff, Ltd.

(57) ABSTRACT

Controlling the admission of interactive television iTV applications to an iTV application distribution system is accomplished through the use of iTV application profiles that enumerate sets of allowed functions and behaviors for the iTV applications within the distribution system. In general, the profiles comprise filters that enable various functions within the distribution system, and may be applied to the iTV applications according to any of a number of bases. The distribution system includes an interface or console adapted to permit a system operator to create the application profiles and establish rules for attaching the profiles to the iTV applications, and an application profile engine configured to automatically validate the iTV applications against the profiles according to those rules.

20 Claims, 1 Drawing Sheet

Related U.S. Application Data continuation-in-part of application No. 10/390,064, filed on Mar. 14, 2003, now Pat. No. 8,042,132.

(60) Provisional application No. 60/486,568, filed on Jul. 11, 2003.

(51) Int. Cl.

| | | |
|---|---|---|
| *G06Q 30/02* | (2012.01) | |
| *H04N 21/241* | (2011.01) | |
| *H04N 21/258* | (2011.01) | |
| *H04N 21/262* | (2011.01) | |
| *H04N 21/442* | (2011.01) | |
| *H04N 21/658* | (2011.01) | |
| *H04N 21/81* | (2011.01) | |

(52) U.S. Cl.
CPC .. *H04N 21/25808* (2013.01); *H04N 21/26291* (2013.01); *H04N 21/4424* (2013.01); *H04N 21/6582* (2013.01); *H04N 21/8166* (2013.01); *H04N 21/8545* (2013.01)

(58) Field of Classification Search
CPC ........... H04N 21/4424; H04N 21/6582; H04N 21/8545; H04N 21/8166; G06Q 30/02
See application file for complete search history.

(56) References Cited

U.S. PATENT DOCUMENTS

| | | | |
|---|---|---|---|
| 5,353,121 A | 10/1994 | Young et al. | |
| 5,485,221 A | 1/1996 | Banker | |
| 5,583,563 A | 12/1996 | Wanderscheid et al. | |
| 5,589,892 A | 12/1996 | Knee et al. | |
| 5,592,551 A | 1/1997 | Lett et al. | |
| 5,594,509 A | 1/1997 | Florin et al. | |
| 5,613,057 A | 3/1997 | Caravel | |
| 5,621,456 A | 4/1997 | Florin et al. | |
| 5,657,072 A | 8/1997 | Aristides et al. | |
| 5,659,793 A | 8/1997 | Escobar et al. | |
| 5,666,645 A | 9/1997 | Thomas et al. | |
| 5,675,752 A | 10/1997 | Scott et al. | |
| 5,694,176 A | 12/1997 | Bruette | |
| 5,802,284 A | 9/1998 | Karlton et al. | |
| 5,826,102 A | 10/1998 | Escobar | |
| 5,844,620 A | 12/1998 | Coleman et al. | |
| 5,850,218 A | 12/1998 | Lajoie et al. | |
| 5,852,435 A | 12/1998 | Vigneaux | |
| 5,860,073 A | 1/1999 | Ferrel et al. | |
| 5,883,677 A | 3/1999 | Hofmann | |
| 5,892,902 A | 4/1999 | Clark | |
| 5,892,905 A | 4/1999 | Brandt | |
| 5,905,492 A | 5/1999 | Straub et al. | |
| 5,929,849 A | 7/1999 | Kikinis | |
| 5,990,890 A | 11/1999 | Etheredge | |
| 5,996,025 A | 11/1999 | Day et al. | |
| 6,002,394 A | 12/1999 | Schein et al. | |
| 6,005,561 A | 12/1999 | Hawkins et al. | |
| 6,008,803 A | 12/1999 | Rowe | |
| 6,008,836 A | 12/1999 | Bruck et al. | |
| 6,016,144 A | 1/2000 | Blonstein et al. | |
| 6,025,837 A | 2/2000 | Matthews, III et al. | |
| 6,049,823 A | 4/2000 | Hwang | |
| 6,061,695 A | 5/2000 | Slivka et al. | |
| 6,067,108 A | 5/2000 | Yokote | |
| 6,088,722 A | 7/2000 | Herz et al. | |
| 6,091,411 A | 7/2000 | Straub et al. | |
| 6,094,237 A | 7/2000 | Hashimoto | |
| 6,141,003 A | 10/2000 | Chor et al. | |
| 6,148,081 A | 11/2000 | Szymanski et al. | |
| 6,162,697 A | 12/2000 | Singh et al. | |
| 6,169,543 B1 | 1/2001 | Wehmeyer | |
| 6,172,677 B1 | 1/2001 | Stautner et al. | |
| 6,177,931 B1 | 1/2001 | Alexander et al. | |
| 6,191,781 B1 | 2/2001 | Chaney et al. | |
| 6,195,692 B1 | 2/2001 | Hsu | |
| 6,205,582 B1 | 3/2001 | Hoarty | |
| 6,219,839 B1 | 4/2001 | Sampsell | |
| 6,239,795 B1 | 5/2001 | Ulrich et al. | |
| 6,240,555 B1 | 5/2001 | Shoff | |
| 6,281,940 B1 | 8/2001 | Sciammarella | |
| 6,292,187 B1 | 9/2001 | Gibbs et al. | |
| 6,292,827 B1 | 9/2001 | Raz | |
| 6,295,057 B1 | 9/2001 | Rosin et al. | |
| 6,314,569 B1 | 11/2001 | Chernock et al. | |
| 6,317,885 B1 | 11/2001 | Fries | |
| 6,345,305 B1 | 2/2002 | Beck et al. | |
| 6,405,239 B1 | 6/2002 | Addington et al. | |
| 6,415,438 B1 | 7/2002 | Blackketter et al. | |
| 6,421,067 B1 | 7/2002 | Kamen | |
| 6,426,779 B1 | 7/2002 | Noguchi et al. | |
| 6,442,755 B1 | 8/2002 | Lemmons et al. | |
| 6,477,705 B1 | 11/2002 | Yuen et al. | |
| 6,486,920 B2 | 11/2002 | Arai et al. | |
| 6,522,342 B1 | 2/2003 | Gagnon | |
| 6,529,950 B1 | 3/2003 | Lumelsky et al. | |
| 6,530,082 B1 | 3/2003 | Del Sesto et al. | |
| 6,532,589 B1 | 3/2003 | Proehl et al. | |
| 6,564,263 B1 | 5/2003 | Bergman et al. | |
| 6,567,104 B1 | 5/2003 | Andrew et al. | |
| 6,571,392 B1 | 5/2003 | Zigmond et al. | |
| 6,591,292 B1 | 7/2003 | Morrison et al. | |
| 6,621,509 B1 | 9/2003 | Eiref et al. | |
| 6,636,887 B1 | 10/2003 | Augeri | |
| 6,658,661 B1 | 12/2003 | Arsenault et al. | |
| 6,678,891 B1 | 1/2004 | Wilcox et al. | |
| 6,684,400 B1 | 1/2004 | Goode et al. | |
| 6,704,359 B1 * | 3/2004 | Bayrakeri .......... H04N 5/44543 348/699 | |
| 6,731,310 B2 | 5/2004 | Craycroft et al. | |
| 6,745,367 B1 * | 6/2004 | Bates ................ G06F 17/30867 707/E17.109 | |
| 6,760,043 B2 | 7/2004 | Markel | |
| 6,763,522 B1 | 7/2004 | Kondo et al. | |
| 6,766,526 B1 | 7/2004 | Ellis | |
| 6,806,887 B2 | 10/2004 | Chernock et al. | |
| 6,857,128 B1 | 2/2005 | Borden, IV et al. | |
| 6,886,029 B1 * | 4/2005 | Pecus et al. .................. 709/203 | |
| 6,910,191 B2 | 6/2005 | Segerberg et al. | |
| 6,918,131 B1 | 7/2005 | Rautila et al. | |
| 7,028,327 B1 | 4/2006 | Dougherty et al. | |
| 7,065,785 B1 | 6/2006 | Shaffer et al. | |
| 7,080,400 B1 | 7/2006 | Navar | |
| 7,103,904 B1 | 9/2006 | Blackketter et al. | |
| 7,114,170 B2 | 9/2006 | Harris | |
| 7,134,072 B1 | 11/2006 | Lovett et al. | |
| 7,152,236 B1 | 12/2006 | Wugofski et al. | |
| 7,162,694 B2 | 1/2007 | Venolia | |
| 7,162,697 B2 | 1/2007 | Markel | |
| 7,174,512 B2 | 2/2007 | Martin et al. | |
| 7,197,715 B1 | 3/2007 | Valeria | |
| 7,207,057 B1 | 4/2007 | Rowe | |
| 7,213,005 B2 | 5/2007 | Mourad et al. | |
| 7,221,801 B2 | 5/2007 | Jang et al. | |
| 7,237,252 B2 | 6/2007 | Billmaier | |
| 7,293,275 B1 | 11/2007 | Krieger et al. | |
| 7,305,696 B2 | 12/2007 | Thomas et al. | |
| 7,313,806 B1 | 12/2007 | Williams et al. | |
| 7,337,457 B2 | 2/2008 | Pack | |
| 7,360,232 B2 | 4/2008 | Mitchell | |
| 7,363,612 B2 | 4/2008 | Satuloori | |
| 7,406,705 B2 | 7/2008 | Crinon et al. | |
| 7,440,967 B2 | 10/2008 | Chidlovskii | |
| 7,464,344 B1 | 12/2008 | Carmichael et al. | |
| 7,516,468 B1 | 4/2009 | Deller et al. | |
| 7,523,180 B1 | 4/2009 | DeLuca et al. | |
| 7,587,415 B2 | 9/2009 | Gaurav et al. | |
| 7,624,416 B1 | 11/2009 | Vandermolen et al. | |
| 7,640,487 B2 | 12/2009 | Amielh-Caprioglio et al. | |
| 7,702,315 B2 | 4/2010 | Engstrom et al. | |
| 7,703,116 B1 | 4/2010 | Moreau et al. | |
| 7,721,307 B2 | 5/2010 | Hendricks et al. | |
| 7,743,330 B1 | 6/2010 | Hendricks et al. | |
| 7,752,258 B2 | 7/2010 | Lewin et al. | |

(56) References Cited

U.S. PATENT DOCUMENTS

| | | |
|---|---|---|
| 7,861,259 B2 * | 12/2010 | Barone, Jr. .................. 725/32 |
| 7,913,286 B2 * | 3/2011 | Sarachik et al. ............ 725/135 |
| 7,958,528 B2 | 6/2011 | Moreau et al. |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1 | 2/2013 | Khosla |
| 8,448,208 B2 | 5/2013 | Moreau et al. |
| 8,660,545 B1 | 2/2014 | Redford et al. |
| 8,699,862 B1 | 4/2014 | Sharifi et al. |
| 8,793,256 B2 | 7/2014 | McIntire et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,363,560 B2 | 6/2016 | Moreau et al. |
| 9,516,253 B2 | 12/2016 | De Andrade et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas |
| 2002/0026642 A1 | 2/2002 | Augenbraun et al. |
| 2002/0032905 A1 | 3/2002 | Sherr et al. |
| 2002/0041104 A1 | 4/2002 | Graf et al. |
| 2002/0042915 A1 | 4/2002 | Kubischta et al. |
| 2002/0042920 A1 * | 4/2002 | Thomas ................ G06F 3/0481 725/87 |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin |
| 2002/0078449 A1 * | 6/2002 | Gordon et al. ................ 725/41 |
| 2002/0083450 A1 | 6/2002 | Kamen et al. |
| 2002/0100041 A1 | 7/2002 | Rosenberg |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0169885 A1 | 11/2002 | Alao et al. |
| 2002/0170059 A1 | 11/2002 | Hoang |
| 2002/0171691 A1 | 11/2002 | Currans |
| 2002/0171940 A1 | 11/2002 | He et al. |
| 2002/0184629 A1 | 12/2002 | Sie et al. |
| 2002/0188944 A1 | 12/2002 | Noble |
| 2002/0196268 A1 | 12/2002 | Wolff et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0025832 A1 | 2/2003 | Swart |
| 2003/0028871 A1 * | 2/2003 | Wang .................. H04H 60/65 725/9 |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski |
| 2003/0056218 A1 * | 3/2003 | Wingard ............ H04N 5/44543 725/46 |
| 2003/0058948 A1 | 3/2003 | Kelly et al. |
| 2003/0066081 A1 | 4/2003 | Barone, Jr. et al. |
| 2003/0067554 A1 | 4/2003 | Klarfeld |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman |
| 2003/0084449 A1 | 5/2003 | Chane |
| 2003/0086694 A1 | 5/2003 | Davidsson |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts |
| 2003/0132971 A1 | 7/2003 | Billmaier et al. |
| 2003/0135464 A1 | 7/2003 | Mourad et al. |
| 2003/0140097 A1 | 7/2003 | Schloer |
| 2003/0151621 A1 | 8/2003 | McEvilly et al. |
| 2003/0158777 A1 * | 8/2003 | Schiff et al. .................. 705/14 |
| 2003/0172370 A1 * | 9/2003 | Satuloori et al. ............ 717/120 |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna, Jr. |
| 2004/0003404 A1 | 1/2004 | Boston et al. |
| 2004/0019900 A1 | 1/2004 | Knightbridge et al. |
| 2004/0019908 A1 | 1/2004 | Williams et al. |
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 * | 4/2004 | Dureau ............ G06Q 30/0251 725/9 |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0128699 A1 * | 7/2004 | Delpuch et al. ............. 725/120 |
| 2004/0133923 A1 | 7/2004 | Watson et al. |
| 2004/0136698 A1 | 7/2004 | Zhou et al. |
| 2004/0168186 A1 | 8/2004 | Rector et al. |
| 2004/0172648 A1 | 9/2004 | Xu et al. |
| 2004/0189658 A1 * | 9/2004 | Dowdy .................. G09G 5/005 345/600 |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 * | 6/2005 | Wei .................... 725/100 |
| 2005/0149972 A1 | 7/2005 | Knudson |
| 2005/0155063 A1 | 7/2005 | Bayrakeri et al. |
| 2005/0160458 A1 * | 7/2005 | Baumgartner ......... H04H 60/46 725/46 |

(56) References Cited

U.S. PATENT DOCUMENTS

| | | |
|---|---|---|
| 2005/0262542 A1 | 11/2005 | Deweese et al. |
| 2005/0283800 A1* | 12/2005 | Ellis et al. ............... 725/40 |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0105793 A1 | 5/2006 | Gutowski et al. |
| 2006/0125962 A1* | 6/2006 | Shelton ............... G06F 3/14 348/588 |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0248572 A1 | 11/2006 | Kitsukama et al. |
| 2007/0019001 A1 | 1/2007 | Ha |
| 2007/0064715 A1 | 3/2007 | Lloyd et al. |
| 2007/0112761 A1 | 5/2007 | Xu et al. |
| 2007/0220016 A1 | 9/2007 | Estrada et al. |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0148317 A1 | 6/2008 | Opaluch |
| 2008/0163304 A1* | 7/2008 | Ellis ............... H04N 5/44543 725/50 |
| 2008/0189740 A1 | 8/2008 | Carpenter et al. |
| 2008/0196070 A1 | 8/2008 | White et al. |
| 2008/0235725 A1 | 9/2008 | Hendricks |
| 2008/0276278 A1 | 11/2008 | Krieger et al. |
| 2008/0288644 A1 | 11/2008 | Gilfix et al. |
| 2008/0317233 A1 | 12/2008 | Rey et al. |
| 2009/0019485 A1 | 1/2009 | Ellis et al. |
| 2009/0024629 A1 | 1/2009 | Miyauchi |
| 2009/0094632 A1 | 4/2009 | Newnam |
| 2009/0094651 A1 | 4/2009 | Damm et al. |
| 2009/0133025 A1 | 5/2009 | Malhotra et al. |
| 2009/0164904 A1 | 6/2009 | Horowitz et al. |
| 2009/0222872 A1 | 9/2009 | Schlack |
| 2009/0228441 A1 | 9/2009 | Sandvik |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0077057 A1 | 3/2010 | Godin et al. |
| 2010/0079670 A1 | 4/2010 | Frazier et al. |
| 2010/0175084 A1* | 7/2010 | Ellis ............... G06Q 30/00 725/32 |
| 2010/0180300 A1* | 7/2010 | Carpenter et al. ............... 725/40 |
| 2010/0223640 A1 | 9/2010 | Reichardt |
| 2010/0250190 A1 | 9/2010 | Zhang et al. |
| 2010/0251284 A1 | 9/2010 | Ellis |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2012/0002111 A1* | 1/2012 | Sandoval ............... H04N 5/06 348/521 |
| 2012/0054811 A1 | 3/2012 | Spears |
| 2012/0117151 A1 | 5/2012 | Bill |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1* | 12/2012 | Thomas et al. ............... 725/87 |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0032473 A1 | 1/2014 | Enoki et al. |
| 2014/0068648 A1 | 3/2014 | Green et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1 | 10/2014 | Vehovsky et al. |
| 2014/0327677 A1 | 11/2014 | Walker |
| 2014/0359662 A1 | 12/2014 | Packard et al. |
| 2014/0365302 A1 | 12/2014 | Walker |
| 2014/0373032 A1 | 12/2014 | Merry et al. |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 0963115 A1 | 12/1999 |
| EP | 1080582 B1 | 3/2001 |
| EP | 1058999 | 4/2003 |
| GB | 2323489 A | 9/1998 |
| WO | 9963757 | 12/1999 |
| WO | 0011869 | 3/2000 |
| WO | 00/33576 | 6/2000 |
| WO | 0110115 A1 | 2/2001 |
| WO | 0182613 | 11/2001 |
| WO | 02063426 | 8/2002 |
| WO | 02063471 | 8/2002 |
| WO | 02063851 | 8/2002 |
| WO | 02063878 | 8/2002 |
| WO | 03009126 A1 | 1/2003 |
| WO | 2003/026275 A2 | 3/2003 |
| WO | 2011/053271 A1 | 5/2011 |
| WO | 2012/094105 A1 | 7/2012 |
| WO | 2012/154541 A1 | 11/2012 |

OTHER PUBLICATIONS

Watchwith webpage; http://www.watchwith.com/content_owners/watchwith_plalform_components.jsp (last visited Mar. 12, 2013).

Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

(56) References Cited

OTHER PUBLICATIONS

Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Office Action in U.S. Appl. No. 10/618,210, dated Jun. 28, 2010.
Office Action in U.S. Appl. No. 11/381,508 dated Mar. 16, 2010.
Office Action in U.S. Appl. No. 10/390,064 dated Apr. 12, 2010.
Office Action in U.S. Appl. No. 10/630,815 dated Apr. 13, 2010.
Office Action in U.S. Appl. No. 10/618,210 dated Jan. 21, 2010.
Office Action in U.S. Appl. No. 10/630,815 dated Jul. 9, 2008.
Office Action in U.S. Appl. No. 10/390,064 dated Jan. 25, 2008.
Shim, et al., "A SMIL Based Graphical Interface for Interactive TV", Internet Tech. Laboratory Dept. of Comp. Engineering, San Jose State University, pp. 257-266.
Office Action in U.S. Appl. No. 10/390,064 dated Sep. 4, 2008.
Office Action in U.S. Appl. No. 10/390,064 dated Oct. 27, 2009.
Office Action in U.S. Appl. No. 10/390,064 dated May 13, 2009.
Office Action in U.S. Appl. No. 10/247,901 dated Apr. 9, 2010.
Office Action in U.S. Appl. No. 10/618,210 dated Nov. 21, 2008.
Office Action in U.S. Appl. No. 10/618,210 dated Jun. 8, 2009.
Office Action in U.S. Appl. No. 10/618,210 dated Jun. 6, 2008.
Office Action in U.S. Appl. No. 10/630,815 dated Apr. 21, 2011.
Office Action in U.S. Appl. No. 10/630,815 dated Oct. 5, 2009.
Office Action in U.S. Appl. No. 10/630,815 dated Dec. 24, 2008.
Office Action in U.S. Appl. No. 10/630,815 dated Nov. 28, 2007.
Office Action in U.S. Appl. No. 10/933,845 dated Jun. 23, 2010.
Office Action in U.S. Appl. No. 10/933,845 dated Nov. 24, 2009.
Office Action in U.S. Appl. No. 10/933,845 dated Dec. 13, 2007.
Office Action in U.S. Appl. No. 10/933,845 dated Jul. 9, 2008.
Office Action in U.S. Appl. No. 10/247,901 dated Aug. 11, 2011.
Office Action in U.S. Appl. No. 10/618,210, dated Oct. 4, 2007.
Office Action in U.S. Appl. No. 10/894,740, dated Mar. 10, 2011.
Office Action in U.S. Appl. No. 10/894,740, dated Jul. 7, 2011.
Office Action in U.S. Appl. No. 10/894,740, dated Oct. 14, 2010.
Office Action in U.S. Appl. No. 10/933,845 dated Oct. 19, 2011.
Office Action in U.S. Appl. No. 12/730,771 dated Oct. 5, 2010.
Yoon, et al., "Video Gadget: MPET-7 Based Audio-Visual Content Indexing and Browsing Engine", LG Electronics Institute of Technology, pp. 59-68.
U.S. Appl. No. 10/460,950, filed Jun. 12, 2003.
Office Action in U.S. Appl. No. 10/925,737 dated Feb. 9, 2011.
Office Action in U.S. Appl. No. 09/841,149 dated Nov. 8, 2010.
Office Action in U.S. Appl. No. 10/933,845, dated Jul. 6, 2011.
Office Action in U.S. Appl. No. 10/618,210, dated Jul. 11, 2011.
Office Action in U.S. Appl. No. 10/618,210, dated Jan. 25, 2011.
Office Action in U.S. Appl. No. 10/390,064, dated Nov. 8, 2010.
Office Action in U.S. Appl. No. 10/247,901, dated Oct. 13, 2010.
Meta Tv, Inc., PCT/US02/29917 filed Sep. 19, 2002, International Search Report dated Apr. 14, 2003, ISA/US; 6pp.
Sylvain Devillers, "Bitstream Syntax Definition Language: an Input to MPEG-21 Content Representation," Mar. 2001, ISO, ISO/IEC JTC1/SC29/WG11 MPEG01/M7053.
Fernando Periera, "The MPEG-4 Book," Prentice Hall, Jul. 10, 2002.
Michael Adams, "Open Cable Architecture," Cisco Press, Dec. 3, 1999.
Mark Riehl, "XML and Perl," Sams, Oct. 16, 2002.
Canadian Office Action—CA 2,685,833—dated Jan. 22, 2015.
European Extended Search Report—EP 13192112.4—dated May 11, 2015.
Response to European Office Action—European Appl. 13192112.4—submitted Dec. 9, 2015.
European Office Action—EP App 14159227.9—dated Jul. 12, 2016.
Agnieszka Zagozdzinnska et al. "TRIDAQ Systems in HEP Experiments at LHC Accelerator" Kwartalnik Elektroniki I Telekomunikacji, vol. 59, No. 4, Jan. 1, 2013.
CA Office Action—CA App 2,685,833—dated Jan. 27, 2016.
CA Office Action—CA Application 2685833—dated Feb. 8, 2017.
Feb. 19, 2018—European Summons to Oral Proceedings—EP 14159227.9.
Mar. 9, 2018—European Office Action—EP 13192112.4.
CA Response to Office Action—CA Appl. 2,685,833—Submitted Jul. 17, 2015.
Nov. 29, 2017—Canadian Office Action—CA 2,685,833.
Jul. 31, 2018—European Decision to Refuse—14159227.9.

\* cited by examiner

VALIDATING DATA OF AN INTERACTIVE CONTENT APPLICATION

CROSS REFERENCE TO RELATED APPLICATIONS

This application is a divisional of U.S. application Ser. No. 10/672,983, filed Sep. 25, 2003; which is a continuation-in-part of U.S. application Ser. No. 10/390,064, filed Mar. 14, 2003 (now U.S. Pat. No. 8,042,132) and claims the priority benefit of U.S. Provisional Application No. 60/486,568, filed Jul. 11, 2003. All prior applications are incorporated herein by reference in their entireties.

FIELD OF THE INVENTION

The present invention relates to systems and methods for enabling and automating the delivery of interactive television content to subscribers.

BACKGROUND

Interactive television (iTV) is currently available in varying forms and there is perhaps no single, universally accepted definition for this term. Most, however, would agree that iTV combines, in some form or other, the passive viewing experience of traditional TV viewing with the interactive nature of the World Wide Web. Thus, in different implementations, iTV might allow viewers (perhaps more appropriately termed subscribers) to review local news headlines or weather forecasts while watching their favorite television shows, to chat with other viewers about the latest plot twists. Many cable and satellite TV providers have deployed iTV systems that allow subscribers to order products seen in commercials or video on demand presentations with the click of a remote control button. And certainly all iTV systems have a version of an interactive program guide that allows subscribers to learn about and select desired programming.

These and other iTV services are deployed as a set of applications over the service provider's network. Such applications are received at the subscriber's premises via a set-top box or similar unit, where they are executed and the corresponding data is displayed on a television. Managing these applications, however, is difficult for the system operator because the applications are often provided by different vendors. Therefore, an application management system that is capable of controlling deployment of iTV applications would be desirable.

SUMMARY OF THE INVENTION

In one embodiment, the present invention allows for controlling admission of interactive television iTV applications to an iTV application distribution system through the use of previously established iTV application profiles that enumerate sets of allowed functions and behaviors for such iTV applications within the iTV application distribution system. The iTV application profiles may be applied to the iTV applications on the basis of application provider, groups of providers or types of providers from which the iTV applications originated; and/or iTV application, application groups or application type irrespective of the iTV application provider from which the iTV applications originated.

In general, the iTV application profiles comprise filters that enable various functions within the iTV application distribution system. For example, some or all of the following functions may be so enabled: (i) automated validation of a relationship with an iTV application provider; (ii) automated validation of a correctly formed iTV application; (iii) automated validation of asset reference integrity within a specified iTV application; (iv) automated formatting of a target iTV application; (v) automated bandwidth allocation verification for one or more of the iTV applications; (vi) automated validation to ensure that the iTV applications access only permitted set-top box functions and resources such as memory and local data stores; (vii) automated validation to ensure that respective parts of iTV applications have arrived for distribution in accordance with a previously established distribution schedule; (viii) automated verification of the iTV applications' make up; (ix) automated validation of restrictions on the iTV applications' ability to invoke other applications; and (x) automated validation of the iTV applications' use of one or more settings for iTV services provided globally by an iTV application service provider to multiple iTV application providers.

The iTV applications may be expressed as packages of XML documents (or as binary objects with XML metadata describing the attributes and functions of the attached application), and the iTV application profiles may be applied across sets of such documents that make up each of the packages. In some cases, separate components of each of the packages will have a corresponding separate iTV application profiles. Where the packages contain more than one document: for example, a first group of documents representing a layout of a respective iTV application and a second group documents representing data of the respective iTV application, the iTV application profiles may include separate profiles for each groups of documents. iTV application profiles applicable to layout documents of an iTV application may be delivered less frequently to the iTV application distribution system than data sets which populate that iTV application.

One or more of the iTV application profiles may include link points from other places in the iTV application distribution system to the iTV application(s) covered by the iTV application profiles. The link points may include channel designations, such that the iTV application(s) covered by the iTV application profiles can be accessed from a given channel identifier; and/or button click targets for other applications that link to the iTV application(s). The iTV application profiles may also specify a fetch frequency and/or target destination for the iTV application distribution system to retrieve the iTV applications.

In another embodiment, the present invention provides for receiving an iTV application, automatically validating the iTV application against one or more iTV application profiles according to validation rules, and, if the iTV application is validated, distributing the iTV application to iTV application clients via an iTV application deployment system, or otherwise rejecting the iTV application. The iTV application may be received in response to a scheduled fetch thereof according to a schedule specified by at least one of the iTV application profiles. Alternatively, the iTV application may be received in response to a distribution thereof by an iTV application provider, or may be fetched in response to an automated system prompt to do so.

In some cases, one or more of the iTV application profiles may specify a fetch frequency and a target destination from which to fetch the iTV application. Such a target destination may in fact include multiple addresses representing locations of different components of application content. Validation of the iTV application may be performed upon receipt of the iTV application, and/or when a time window for deployment of the iTV application is relevant. Such a time window may be specified within the iTV application itself and/or within the metadata associated with the iTV Application.

Yet another embodiment of the present invention provides an iTV deployment system that includes an application profile engine (APE) configured to automatically validate iTV applications provided by iTV application providers against iTV application profiles prior to distribution of the iTV applications to iTV application clients; and an interface for the APE adapted to permit an iTV system operator to create the application profiles, which are rules of behavior and limitations for the iTV applications. The APE may also be configured to allow the iTV system operator to establish rules for attaching the application profiles to the iTV applications. Such rules may be tested by evaluating data within the iTV applications and may include one or more of: (i) attaching specific application profiles to specific iTV applications from certain application providers; (ii) attaching specified application profiles to those iTV applications from a defined set of the application providers; (iii) attaching specified application profiles to any of iTV applications of a specified type (e.g., an attribute of an application or application component, the set of allowable values therefore being defined by a system operator or perhaps an industry standards body); (iv) attaching specified application profiles to data documents within iTV application packages from specific application providers; (v) attaching specified application profiles to template documents from certain application providers; and (vi) attaching specified application profiles to specific applications from certain application providers. Of course, more than one of the application profiles may be applicable to one or more of the iTV applications and one iTV application may be validated by multiple application profiles where more than one profile selection criteria is valid for a that specific application or application component.

The interface may also be configured to permit a user to view the application profiles and how the application profiles will apply to iTV applications from various application providers. Application profile storage means adapted to store the application profiles for use by the APE and/or application profile event storage means adapted to store information regarding successful or unsuccessful validation attempts by the APE may also be provided.

BRIEF DESCRIPTION OF THE DRAWINGS

The present invention is illustrated by way of example, and not limitation, in the figures of the accompanying drawings, in which.

DETAILED DESCRIPTION

Figure 1:
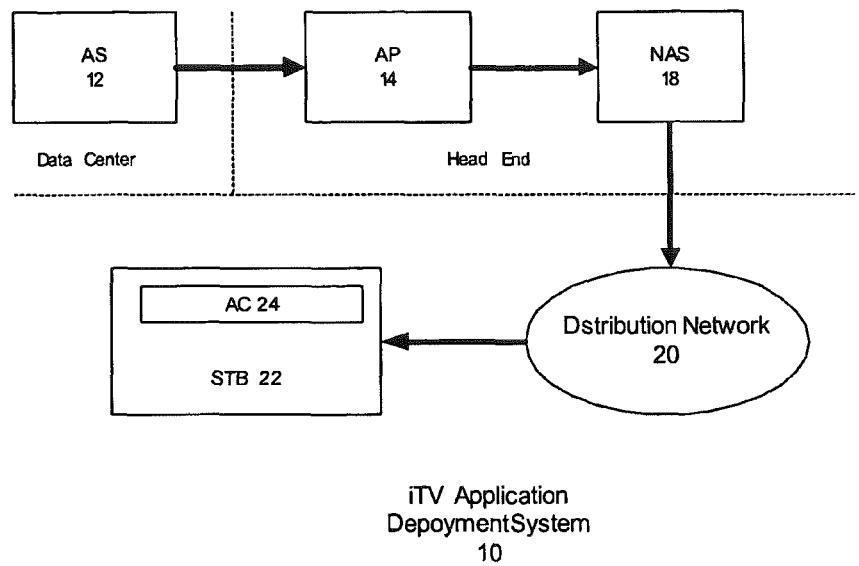
FIG. 1 illustrates an example of an iTV application deployment system within which the methods and systems of the present invention may be implemented.

The '064 Application describes a system (an iTV application automation system) that provides an iTV system operator with the ability to manage iTV applications in an automated manner. One specific aspect of such iTV automation is the control and management of iTV applications as a system of applications as opposed to unique or individual applications. The present invention provides unique control methodologies for enabling such iTV automation.

One example of these methods applies when the iTV application definitions (which may describe application layout, function, and data) are described in a self-describing language (such as the eXtensible Markup Language or XML), as was the situation in the above-cited patent application. In another case the application itself may be a binary but have associated metadata to describe the behaviors of the application. The preferable case is that of an XML application so there is no ambiguity or obscurity as to interpreting application function; however an obscured application with associated metadata will suffice. In either case the applications, or applications' metadata, can be processed prior to execution and interrogated as to their function and requirements. Specifically, the system operator hosting (or facilitating the carriage of) the iTV applications may establish an application profile for each application provider (or groups of application providers, or types of applications providers), where the application profile enumerates a set of allowed functions and behaviors to which that provider, group of providers, or types of providers must conform. Such a filter can also be applied to specific applications, application types, and/or groups of applications irrespective of application provider. When iTV applications are expressed as packages of XML documents, as discussed in the '064 Application, or as XML metadata, the application profile can be applied across the set of documents that make up the package, or separate application profiles can be established that individually address different components, sets of components, or types of components within the packages. The present invention thus provides a unique control mechanism for the system operator such that the flow of applications through the system can be automated, but at the same time controlled.

As indicated above, an iTV automation system provides the ability to control and manage the flow of iTV applications. This control and management is facilitated, in accordance with the present invention, by establishing an application profile that can be implemented by a television service provider (cable MSO, Telco, satellite operator, etc) and that further can shape the allowed behaviors of applications that run on the system. Since the content programmer services (the iTV applications) are defined in terms of a self-describing language, such as XML, or have associated XML metadata, they can be easily validated against rules (the "application profile") that a system operator has established for that application provider, or for a specific applications from that application provider, or rules specified for types of applications irrespective of application provider.

FIG. 1 illustrates an overview of the iTV application automation system 10 discussed in detail in the '064 Application. This system may be regarded as an end-to-end environment for developing, delivering and deploying iTV applications and is an example of an environment in which the methods and systems of the present invention may be deployed.

A detailed description of the operation and features of the iTV application automation system 10 is provided in the '064 Application. To summarize, an application server (AS) 12 is responsible for programming, packaging and optimizing content for different iTV applications and platforms. Such content may be composed of templates, data and business rules packages. The iTV application data may be generated from dynamic data feeds that are delivered to the AS 12 from various content providers (e.g., via the Internet) or from local sources.

Once authored, the application packages, which may include layouts, data, ad campaigns, programming rules and directives files specific to different middleware systems, are delivered to an application proxy (AP) server 14 that may be located at the data center or in the network head end (or network operator regional distribution center). At the AP 14, the applications are integrated with various network components so that they can be broadcast to subscribers. In particular, the updated AC application packages are delivered to a network application server 18 and then broadcast through the distribution network 20 (e.g., via in-band and/or out-of-band carousels) to the set-top box 22.

At the set-top box 22, an application client (AC) 24 is responsible for the application rendering and behavior on top of the set-top box middleware. When a user makes a selection to use a particular application, the set-top box 22 will invoke the AC 24 and tune to the proper in-band carousel (and/or fetch from an out-of-band carousel) to retrieve the necessary application files. The AC 24 may also load files directly from a local client database. Once these files are loaded into the set-top box memory, the user can begin interacting with the application.

Each time a "package" of application files is created at AS 12, the package is delivered to an optimizer, which is responsible for converting the files into a highly optimized format readable by the AC 24. The optimized package of files is then delivered to a packager, where it is prepared for delivery to the AP server 14. Alternatively, in some embodiments an MSO-deployed application management system may be used for centralized distribution and management of application assets and metadata. In such cases, the functions of the optimizer may be moved to the AP server 26, which collaborates with a packager proxy, the network application server 18 and other $3^{rd}$ party components in the network head end to validate, filter and resolve the application assets into a highly optimized format readable by the AC 24.

Figure 2:
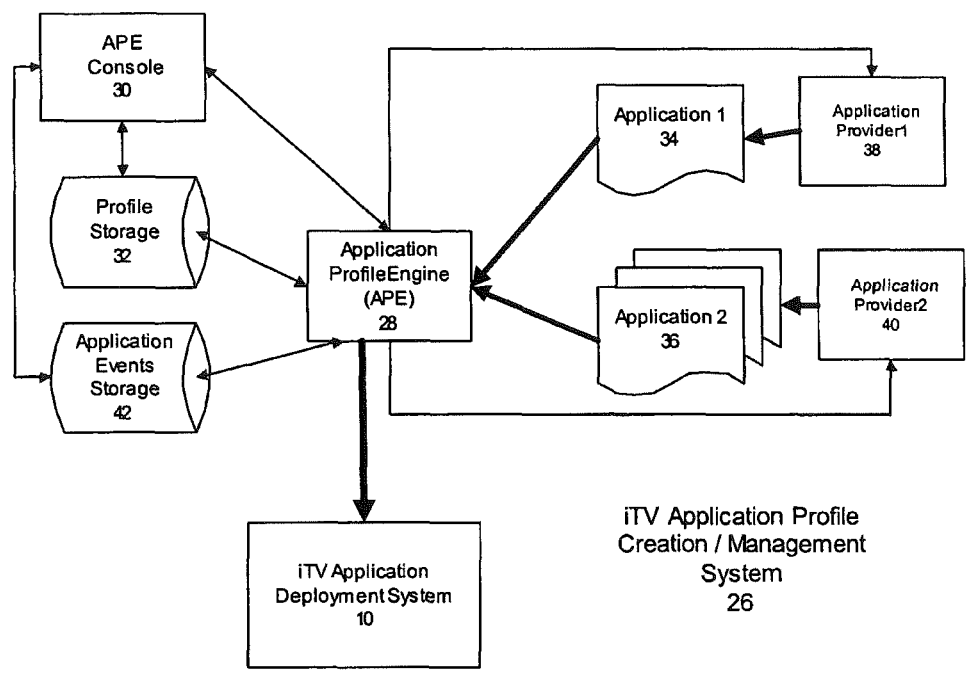
FIG. 2 illustrates an example of an iTV application control and management system configured in accordance with an embodiment of the present invention.

The present invention introduces the ability to control admission of iTV applications to the iTV application distribution system 10 through the use of previously established iTV application profiles that enumerate sets of allowed functions and behaviors for such iTV applications within the iTV application distribution system. FIG. 2 shows an example of an application profile creation and management system 26, which embodies the present invention and includes: (i) an application profile engine (APE) 28; (ii) an interface, APE console 30, to the APE that allows the system operator to specify application profiles; (iii) a storage device, profile storage 32, to store said application profiles; and (iv) one or more iTV applications 34-36.

System operators (or service support personnel on behalf of a system operator) use the APE console 30 to establish the application profiles, which are rules of behavior and limitations for iTV applications. The APE 28 is also used to establish the rules for attaching application profiles to incoming applications. The rules for attaching application profiles are tested by evaluating data within the application documents, or associated metadata, and include but are not limited to (i) attaching specified profiles to all applications from specified application providers; (ii) attach specified profiles to all applications from a defined set of application providers—where the APE is used to establish a set of application providers; (iii) attaching specified profiles to any application of a specified type, e.g., "overlay"; (iv) attaching specified profiles to data documents within application packages from specified application providers; (v) attaching specified profiles to template/layout documents from specified application providers; (vi) attach specified profiles to specific applications from specified application providers; etc. More than one profile can apply to a single incoming application because the profile application rules may be overlapping. The APE console 30 can be used to view all rules and how they will apply to various applications from various application providers or groups of application providers. The rules described herein then are stored in the profile storage 32. In one embodiment of this invention the profile storage 32 is a relational database.

In some cases the APE console 30 is also used to input information about the general system of applications as it relates to the application, or applications, for which the profile is destined. These settings are referred to as "global settings" and are definitions in/to the profile that describe how the application will be accessed from within a larger system of applications, or general service. One example is to specify, in the application profile, the link points from other places in the iTV service to the application(s) covered by the application profile. Examples of link points include, but are not limited to, (i) setting a channel designation such that the application(s) covered by a particular application profile can be accessed from a given channel id (channel tune event); and (ii) setting button click targets for other applications that link to the application(s) covered by a particular application profile. In other embodiments of this invention, the "global settings" are controlled by a companion to the APE 28, however, the location of the "global settings" and their handling is not critical to the invention.

Application providers 38-40 create applications for distribution within one or more system operator networks. The system operator's iTV automation system 10, of which the application profile system 26 illustrated in FIG. 2 is now an integral part, receives these applications as distributed by the application provider, or retrieves these applications from the application provider on a scheduled basis. In the case of a scheduled retrieval of applications, the application profile (or some secondary mechanism) specifies a fetch frequency and a target destination from which to fetch the application documents. Multiple targets may be specified where the components of an application may originate from different sources. In one embodiment of this invention it is the APE 28 that receives the applications, or fetches, or causes to be fetched, the applications. Once the application is in control of the APE 28, the APE 28 will then validate the application, or components of the application, against rules established that match the incoming application. This may be done, for example, following optimization of an application but prior to packaging.

As discussed above, the applications may, in some cases, be packages that contain more than one document: that is, one or more documents representing templates/layouts of the application and one or more documents representing the data of the applications. An application profile can therefore be established for the application package and/or for any component of the package. Having separate profiles for the different components of an application package then allows the application provider to deliver the root application definition (layout documents) less frequently than the data sets that populate the application. In one embodiment the package also contains physical assets such as images or video. The system operator uses the APE console 30 to establish profiles that are then stored into the profile storage 32. In one embodiment of this invention the applications are received by the APE 28 and upon receipt they are validated against the established profiles. In another embodiment all validation, excluding asset reference integrity (described below), will be checked at time of application receipt, but the validation of the asset references is delayed until the time window for deployment of the application is relevant. Note that applications may be specified for deployment in some specific time window and may be received by the APE 28 prior to that time window. The time window of availability for an application may be specified in one of the application documents.

If the APE 28 finds an application to be in violation of its profile (or profiles if more than one profile applies to a given application) then the application is rejected. In one embodiment of this invention the APE 28 will then send a return message to the application provider listing the application violations and will record the error into an application events storage 42 such that the system operator has visibility into the failed attempt. Such storage may be part of a services manager module in AS 12.

If the APE 28 finds the application to pass all application profile tests then in one embodiment of this invention, the APE 28 will then send a message to the application provider to signify the successful acceptance of their application and will then record the acceptance of the applications to the application events storage 42 such that the system operator has visibility into the instances of the accepted applications. Further, in this embodiment, the APE 28 will pass the application in to the iTV application deployment system 10 (e.g., to the AP 14) for deployment if the application's time window is relevant or will pass the application on to an application holding storage if the application's deployment time window is not currently relevant. In the case where the application is held pending a time window, the application will undergo additional profile validations at the point where the time window becomes relevant or shortly there before. In yet further embodiments validation timings will be adjusted to meet the needs of specific validation requirements.

Once the incoming application has been validated the APE 28 may use the application profile's "global settings" to determine which link points may need to be updated. If the validation failed then the link points may need to be removed, stubbed out, or set to alternates—these rules all governed by the data in the global settings. If the validation passes then the link points need to be set to the current version of this application.

In one embodiment, the APE 28 is implemented entirely as a portion of server component 12. In another embodiment of this invention, parts of the APE 28 are implemented in the set-top box client 24.

Validation examples: The following are illustrations of validations that the system operator may elect to have automatically performed by the APE 28 and are in no way limiting of the types of application attributes and behaviors that can be validated using this invention.

(a) Validate relationship with application provider. Prior to allowing the application provider's application to flow through the operator's system 10, the application may be validated to see that it originates from a provider that has established a relationship with the system operator that allows for application flow. The validation may be performed by evaluating a tag within the application document that names the application provider.

(b) Correctly formed application. Prior to allowing the application provider's application to flow through the operator's system 10, the application may be validated to see that it conforms to syntax requirements established for the applications. In the iTV application system described in the '064 Application the applications are written in XML. In this instance the XML is validated to see that it is properly formed XML and secondly validated to see that it meets the XML DTD required by that system.

(c) Integrity of asset references within the application. Prior to allowing the application provider's application to flow through the operator's system 10, the application may be validated to see that it only contains content reference links that are valid within the specific system within which it will be deployed. Examples of content reference links include VOD links, images, links, channel id, and secondary application links. This list is only meant to be representative of the types of content links. Any link may be validated to see that the resource is (or will be) valid at the time the applications is permitted to pass through the system.

(d) Format of application. Prior to allowing the application provider's application to flow through the operator's system 10, the application may be validated to see that it is in an approved implementation form. In one embodiment of the present invention approved forms include (i) full-screen with no inset TV; (ii) full-screen with video inset; (iii) ¼ A screen bottom overlay; (iv) ¼ screen top overlay. Other embodiments of this invention may include other application formats. In order to validate the application format the application profile examiner will parse the application document, or application metadata to determine the layout of the application.

(e) Bandwidth. Prior to allowing the application provider's application to flow through the operator's system 10, the application may be validated to see that it consumes no more that an allocated amount of bandwidth. This validation is of particular interest in a system where the application will be broadcast via a carousel. There is a limited amount of space available in a carousel.

(f) Access to set top box functions. Prior to allowing the application provider's application to flow through the operator's system 10, the application may be validated to see that it only accesses functions approved by the profile (or does not access function denied by the profile). The APE can test for the use of these functions by parsing the application document, or application metadata, and looking for instances of function usage. Examples of such functions include, but are not limited to, (i) setting a 'reminder', (ii) triggering a PVR record for a specific program, (iii) changing the channel, or (iv) reading or changing a set top box setting.

(g) Frequency of update. Prior to allowing the application provider's application to flow through the operator's system 10, the application may be validated to see that it has arrived after a specific interval since that last successful delivery of an application from that same provider. That is, the system operator can specific that any given provider cannot update their application more frequently that some given interval.

(h) Numbers of i-frames, p-frames, templates, and/or application pages. Prior to allowing the application provider's application to flow through the operator's system 10, the application may be validated to see that it does not exceed the limits for the number of allowed i-frames, p-frames, templates, or distinct application pages. For example, using the present invention a system operator may specify that a given application is only allowed to have one i-frame background and is not allowed to have any p-frame images, and further that the application is allowed to have only two unique layout templates, and only five distinct pages. In this case the system operator has specified a single application profile that spans several elements of an application package.

(i) Ability to invoke other applications. Prior to allowing the application provider's application to flow through the operator's system 10, the application may be validated to see that it only invokes programs that it has been approved to access by the application profile established by the system operator using the interface 30 to the APE 28. In one embodiment of this invention the system operator will restrict the ability for applications to call other applications. This restriction will allow the application to call only other applications from the same provider, and/or only allow the application to call specific services enumerated by the system operator such as Help, Menu, Guide, or other services for which the system operator wishes to allow general access from applications.

(j) Application Home within the ITV Service. In addition to "global settings" residing as part of the application profile (or some external source acting upon the application in conjunction with the application profile), the application definition itself may also contain definitions for these global settings. In this case the settings provided by the application will be validated against any rules established by the system operator governing the application provider's use of those settings. That is, prior to allowing the application provider's application to flow through the operator's system 10, the application may be validated to see that it specifies (i) the approved category or categories, and/or locations wherein a description and link to the application may be placed; (ii) the approved channel map specification, in the case of a channel application, for including this application in the ITV service. This specification provides information to the APE 28 to indicate where the application "snaps in" to the system operator's overall iTV service. In one embodiment of this invention the system operator will restrict the ability for applications to 'snap in' to the iTV service in an unauthorized manner. In another embodiment of this invention, the APE 28 will automatically adjust the iTV service to "snap in" the application according to the specified application profile instructions. In still another embodiment of this invention the "global settings" for the "snap-in" are set by the system operator and not accessible from within the application provider's application except as it relates to application provider applications that are invoked from within other applications provided by that same application provider.

Thus, systems and method to control admission of iTV application to an iTV application distribution system through the use of iTV application profiles have been described. It should be noted that throughout the foregoing discussion, the iTV applications described may be implemented as XML or may be binaries with XML metadata and, hence, all references to parsing or reading the XML should read as parsing the application itself where it is in some readable self-described form such as XML or the XML metadata where the application is not so readable. Thus, though discussed with reference to certain illustrated embodiments and other examples, the present invention is not meant to be limited thereby and should only be measured in terms of the claims, which follow.

What is claimed is:

1. A method comprising:
receiving a first interactive content application for distribution, via a network, to one or more user devices;
evaluating data within the first interactive content application to determine an application type corresponding to the first interactive content application;
associating the first interactive content application with one or more application profiles for the application type, wherein the one or more application profiles comprise an accessibility setting that indicates the application type is accessible from a second interactive content application;
performing, by one or more computing devices, a validation on data of the first interactive content application by applying one or more validation rules established in the one or more application profiles;
based on a determination that the validation has failed, causing, by the one or more computing devices, the application type to be inaccessible from the second interactive content application by modifying the accessibility setting; and
transmitting, to at least one of the one or more user devices, content associated with the second interactive content application.

2. The method of claim 1, wherein the one or more validation rules comprise a rule for validating that the first interactive content application was received from a provider with an established relationship with an operator of the network.

3. The method of claim 1, wherein the one or more validation rules comprise a rule for validating the first interactive content application against a syntax requirement of a data format protocol.

4. The method of claim 1, wherein the one or more validation rules comprise a rule for validating that the first interactive content application comprises no references to invalid data assets.

5. The method of claim 1, wherein the one or more validation rules comprise a rule for validating that the first interactive content application is configured to display in a valid display screen format.

6. The method of claim 5, wherein the valid display screen format comprises at least one of a full-screen with no video inset format, a full-screen with video inset format, a partial screen bottom overlay format, or a partial screen top overlay format.

7. The method of claim 1, wherein the one or more validation rules comprise a rule for validating that the first interactive content application will not exceed a limit on bandwidth.

8. The method of claim 1, wherein the one or more validation rules comprise a rule for validating that the first interactive content application is configured to access only approved user device functions.

9. The method of claim 8, wherein the approved user device functions comprise at least one of a reminder setting, a digital video recording function, or a channel change function.

10. The method of claim 1, wherein the one or more validation rules comprise a rule for validating that the first interactive content application was received after an interval that defines a limit to an update frequency for the first interactive content application.

11. The method of claim 1, wherein the one or more validation rules comprise a rule for validating that the first interactive content application does not exceed a limit for at least one of (a) a number of i-frames and p-frames or (b) a number of application pages.

12. The method of claim 1, wherein the application type comprises a type of overlaying behavior.

13. The method of claim 1, wherein the accessibility setting comprises a button click target for accessing the application type from the second interactive content application, and wherein the modifying comprises removing the button click target from the one or more application profiles.

14. A method comprising:
- performing, by one or more computing devices, a validation on data of a first interactive content application by applying one or more validation rules; and
- based on a determination that the validation has succeeded, causing, by the one or more computing devices, the first interactive content application to be accessible from a second interactive content application by updating an accessibility setting associated with the first interactive content application; and
- transmitting, to one or more user devices, content associated with the first interactive content application.

15. The method of claim 14, wherein the one or more validation rules comprise a rule for validating that the first interactive content application is configured to display in a valid display screen format.

16. The method of claim 14, further comprising determining which accessibility settings need to be updated based on an application profile; and
- wherein the updating comprises setting the accessibility setting to indicate that the first interactive content application is accessible from the second interactive content application.

17. The method of claim 16, wherein the accessibility setting comprises a button click target for the second interactive content application.

18. The method of claim 1, wherein the accessibility setting comprises a button click target for accessing the application type from the second interactive content application, and wherein the modifying comprises setting the button click target to an alternative value.

19. A method comprising:
- performing, by one or more computing devices, a validation on data of a first interactive content application by applying one or more validation rules;
- based on a determination that the validation has failed, causing, by the one or more computing devices, the first interactive content application to be inaccessible from a second interactive content application by modifying an accessibility setting associated with the first interactive content application; and
- transmitting, to one or more user devices, content associated with the second interactive content application.

20. The method of claim 19, wherein the accessibility setting comprises a button click target for accessing the first interactive content application from the second interactive content application,
- wherein the accessibility setting is comprised in an application profile, and
- wherein the modifying comprises removing, from the application profile, the button click target.

\* \* \* \* \*

UNITED STATES PATENT AND TRADEMARK OFFICE
CERTIFICATE OF CORRECTION

PATENT NO. : 10,171,878 B2
APPLICATION NO. : 14/039734
DATED : January 1, 2019
INVENTOR(S) : Carney et al.

It is certified that error appears in the above-identified patent and that said Letters Patent is hereby corrected as shown below:

On the Title Page

Column 1, Related U.S. Application Data, Line 1:
Please delete "(60)" and insert --(62)--

In the Drawings

Sheet 1, Fig. 1, Reference Numeral 10, Line 2:
Delete "DepoymentSystem" and insert --Deployment System--

In the Specification

Column 8, Detailed Description, Line 19:
After "¼", delete "A"

Column 9, Detailed Description, Line 27:
Delete "ITV" and insert --iTV--

Signed and Sealed this
Nineteenth Day of March, 2019

Andrei Iancu
*Director of the United States Patent and Trademark Office*